United States Patent [19]

Zecher et al.

[11] 4,124,568

[45] Nov. 7, 1978

[54] POLYCONDENSATES

[75] Inventors: Wilfried Zecher; Willi Dünwald; Rudolf Merten, all of Leverkusen, Germany

[73] Assignee: Bayer Aktiengesellschaft, Germany

[21] Appl. No.: 854,112

[22] Filed: Nov. 23, 1977

[30] Foreign Application Priority Data

Nov. 29, 1976 [DE] Fed. Rep. of Germany ....... 2654112

[51] Int. Cl.$^2$ ............................................. C08G 63/52
[52] U.S. Cl. ..................................... 528/59; 260/860; 260/861; 428/375; 528/73
[58] Field of Search .......... 260/75 N, 75 TN, 75 UA, 260/78 UA, 860, 861

[56] References Cited

U.S. PATENT DOCUMENTS

| | | | |
|---|---|---|---|
| 3,560,446 | 2/1971 | Zecher et al. | 260/75 TN X |
| 3,836,606 | 9/1974 | Baum | 260/861 |
| 3,838,106 | 9/1974 | Shuki et al. | 260/75 M |
| 3,876,582 | 4/1975 | Kaiser et al. | 260/75 UA |
| 3,896,098 | 7/1975 | Lasher | 260/75 UA X |
| 4,069,209 | 1/1978 | Lange | 260/75 N |

*Primary Examiner*—Lucille M. Phynes
*Attorney, Agent, or Firm*—Connolly and Hutz

[57] ABSTRACT

A process for the production of polycondensates linked by nitrogen containing five membered rings, wherein a unsaturated cyclic anhydride compound is polycondensed with alcohols and organic polyisocyanates.

12 Claims, No Drawings

POLYCONDENSATES

It is already known that polyimides can be obtained by polymerising monofunctional or polyfunctional maleic acid imides (German Offenlegungsschriften Nos. 1,948,841 = BPS 1 277 790 and 1,810,467 = BPS 1 255 935). In another process for producing these polyheterocyclic compounds, bis maleic acid imides are reacted with polyfunctional amines (German Offenlegungsschrift No. 2,152,973 = BPS 1 355 403). The resulting polyimides are used as thermoplasts and in the electrical insulation field, for example as wire lacquers.

It has now been found that polycondensates linked through five-membered nitrogen-containing rings can be obtained by reacting unsaturated cyclic carboxylic acid anhydride compounds corresponding to the general formula:

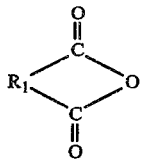

in which $R_1$ represents a mono-unsaturated, difunctional organic radical,
with monofunctional or polyfunctional aliphatic, aliphatic-aromatic or aromatic alcohols and polyfunctional organic isocyanates or corresponding masked polyisocyanates at temperatures in the range of from 0° C. to 500° C. and preferably at temperatures in the range of from 30° C. to 400° C.

The reactions according to the invention surprisingly give polycondensation products although monofunctional acid anhydrides are used for the imide ring formation and even then when monofunctional alcohols are used as starting components.

The reaction products may be processed themselves or in combination, for example with polyesters and polyester imides, to form heat-resistant plastics with excellent properties. They are used, for example, as electrically insulating wire lacquers, films or mouldings.

Starting components suitable for use in the process according to the invention include aliphatic, cycloaliphatic, araliphatic aromatic and heterocyclic polyisocyanates, preferably diisocyanates (cf. Annalen 562, pages 75 to 136), for example ethylene diisocyanate, 1,4-tetramethylene diisocyanate, 1,6-hexamethylene diisocyanate, 1,12-dodecane diisocyanate, cyclobutane-1,3-diisocyanate, cyclohexane-1,3-and-1,4-diisocyanate and any mixtures of these isomers; 1-isocyanato-3,3,5-trimethyl-5-isocyanatomethyl cyclohexane (DAS NO. 1,202,785 = BPS 1 355 404), 2,4-and 2,6-hexahydrotolylene diisocyanate and any mixtures of these isomers; hexahydro-1,3- and/or 1,4-phenylene diisocyanate, perhydro-2,4'- and/or -4,4'-diphenyl methane diisocyanate, 1,3- and 1,4-phenylene diisocyanate, 2,4-and 2,6-tolylene diisocyanate and any mixtures of these isomers; diphenyl methane-2,4'- and/or 4,4',4''-triisocyanate, polyphenyl polymethylene polyisocyanates of the type obtained by condensing aniline with formaldehyde, followed by phosgenation, and described for example in U.K. Pat. Nos. 874,430 and 848,671; perchlorinated aryl polyisocyanates of the type described, for example, in German Auslegeschrift No. 1,157,601; polyisocyanates containing carbodiimide groups of the type described in German Patent No. 1,092,007; diisocyanates of the type described in U.S. Patent No. 3,492,330; polyisocyanates containing allophanate groups of the type described, for example, in U.K. Patent Specification No. 994,890, in Belgian Patent No. 761,626 and in published Dutch Patent Application No. 7,102,524; polyisocyanates containing isocyanate groups of the type described, for example, in German Patent Nos. 1,022,789; 1,222,067 and 1,027,394 and in German Offenlegungsschrifts Nos. 1,929,034 and 2,004,048; polyisocyanates containing urethane groups of the type described, for example, in Belgian Patent No. 752,261 or in U.S. Patent No. 3,394,164; polyisocyanates containing acylated urea groups according to German Patent No. 1,230,778; polyisocyanates containing biuret groups of the type described, for example, in German Patent No. 1,101,394, in U.K. Patent Specification No. 889,050 and in French Patent No. 7,017,514; polyisocyanates produced by telomerisation reactions of the type described, for example, in Belgian Patent No. 723,640; polyisocyanates containing ester groups of the type described, for example, in U.K. Patent Specifications Nos. 956,474 and 1,072,956, in U.S. Patent No. 3,567,763 and in German Patent No. 1,231,688; and reaction products of the above-mentioned isocyanates with acetals according to German Patent No. 1,072,385.

It is also possible to use the distillation residues containing isocyanate groups obtained in the commercial production of isocyanates, optionally in solution in one or more of the above-mentioned polyisocyanates. Any mixtures of the above-mentioned polyisocyanates may also be used.

It is preferred to use polyisocyanates corresponding to the general formula:

$$R^2(-NCO)_z$$

in which $R^2$ represents an aliphatic radical containing from 1 to 20 carbon atoms an aromatic radical containing from 5 to 12 carbon atoms, a cycloaliphatic radical containing from 5 to 12 carbon atoms, an aliphatic-aromatic radical containing from 6 to 20 carbon atoms and an aromatic or cycloaliphatic radical containing from 5 to 12 carbon atoms and hetero atoms such as N, O or S. Z is an integer from 2 to 4, preferably from 2 to 3, most preferably 2. All radicals may be substituted by halogen, preferably chlorine, alkyl with $C_1-C_{12}$ and/or aryl groups, with $C_6-C_{16}$.

It is preferred to use the commercially readily available mixtures of tolylene diisocyanates, m-phenylene diisocyanate, and also phosgenated condensates of aniline and formaldehyde with a polyphenylene-methylene structure and the symmetrical compounds 4,4'-diisocyanatodiphenyl methane, 4,4'-diisocyanatodiphenl ether, p-phenyl diisocyanate, 4,4'-diisocyanatodiphenyl dimethyl methane, analogous hydroaromatic diisocyanates and aliphatic diisocyanates containing from 2 to 12 carbon atoms such as hexamethylene diisocyanate and diisocyanates derived from isophorone.

The isocyanates may be used in free form and also partly or completely in the form of their derivatives which are obtained by reaction with compounds containing reactive hydrogen and which react as isocyanate donors under the reaction conditions.

The isocyanate donors preferably used are the acyl ureas obtainable from lactams, for example caprolactam, and the carbamic acid esters obtained from aromatic and aliphatic monohydroxy and polyhydroxy compounds which correspond for example to the general formulae:

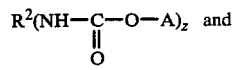 and

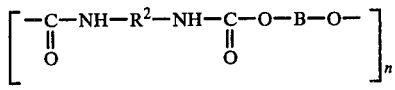

in which $R^2$ and $z$ are as just defined and A represents the organic radical of a monohydroxy compound and B the organic radical of a bi- or tri-functional hydroxy compound, preferably an aliphatic radical containing from 1 to 10 carbon atoms, a cycloaliphatic radical containing from 5 to 10 carbon atoms, an aliphatic-aromatic radical containing from 7 to 12 carbon atoms and an aromatic radical containing from 6 to 12 carbon atoms and $n$ = 1 to 1000, preferably 1 to 100. The radicals may also be substituted by alkyl with $C_1$-$C_{12}$ aryl with $C_6$-$C_{16}$ groups.

Examples of these carbamic acid esters are the carbamic acid esters of phenol, isomeric cresols, their commercial mixtures and similar aromatic hydroxyl compounds, aliphatic monoalcohols, such as methanol, ethanol, propanol, isopropanol, butanol, isobutanol, cyclohexanol, benzyl alcohol and aliphatic diols or polyols, such as ethylene glycol and trimethylol propane.

The urethanes may either be used as such or may be formed in situ by reaction with alcohols.

Instead of using the above-mentioned polyisocyanates, it is also possible to use the analagous polyisothiocyanates as starting materials.

Preferred unsaturated cyclic carboxylic acid anhydride compounds which contain no further functional groups beside the anhydride group are carboxylic acid anhydride compounds corresponding to the general formula:

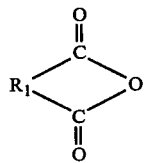

in which $R_1$ represents a mono-unsaturated aliphatic radical preferably an optionally substituted alkenyl radical containing from 2 to 10 carbon atoms and, with particular preference, a radical of the formulae

wherein $R^3$ and $R^4$, same or different, represent hydrogen, an alkyl radical with $C_1$-$C_{12}$ or a halogen atom, preferably chlorine and/or

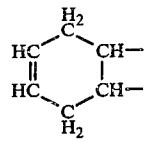

which may be substituted by alkyl groups with $C_1$-$C_{12}$ halogen preferably chlorine or by alkylene groups with $C_1$-$C_5$ as bridge members.

Instead of using the cyclic carboxylic acid anhydrides, it is also possible to use the corresponding carboxylic acids or esters which, like the semiesters for example, may be converted during the reaction into the acid anhydrides. Suitable cyclic carboxylic acid anhydrides are maleic acid-, citraconic acid-, itaconic acid-, dimethyl maleic acid- or dichloromaleic acid anhydride.

It is preferred to use maleic acid anhydride.

The alcohols used in accordance with the invention are preferably compounds corresponding to the general formula:

in which $R_5$ represents an aliphatic radical containing from 1 to 20 carbon atoms, an aliphatic-aromatic radical containing from 7 to 12 carbon atoms and an aromatic radical containing from 6 to 12 carbon atoms, a cycloaliphatic radical containing from 5 to 10 carbon atoms or the residue of a polyether, polyester, polyurea, polyurethane, polyimide or polyhydantoin and $n$ is an integer from 1 to 3, preferably 1 to 2. The radical $R_5$ is derived, for example, from methane, ethane, n-, iso-, tert.-butane, hexane, eicosane, propene, butane, cyclohexane, benzene, diphenyl methane, diphenyl sulphone, toluene, and may be substituted once or several times, for example by alkyl with $C_1$-$C_{12}$ carbonyl or amino groups. It is preferred to use a diol, such as ethylene glycol.

The reaction according to the invention is accompanied by the elimination of carbon dioxide. The IR-spectra of the reaction products show the band combinations typical for carbonyl in five-membered nitrogen heterocycles in the region around 1710 and 1770 cm$^{-1}$.

The reaction according to the invention may be carried out in inert solvents or solvents which form only loose addition compounds or compounds which further react, or even in excess of one of the reaction components. Suitable solvents are (halogenated) hydrocarbons, phenols, esters, lactones, ketones, ethers, substituted amides, nitriles, phosphoric acid amides, sulphoxides and sulphones, for example xylenes, o-dichlorobenzene, phenol, cresols, benzoic acid alkyl ester, butyrolactone, caprolactone, acetophenone, cyclohexanone, glycol monomethyl ether acetate, diethylene glycol monoethyl ether, dimethyl formamide, caprolactam, benzonitrile, ethylene glycol, hexamethyl phosphoric acid triamide, dimethyl sulphoxide, tetramethylene sulphone and mixtures thereof. Preferred solvents are when used as lacquers, the condensates according to the invention may also be applied from melts or (aqueous) dispersions.

The process according to the invention is carried out by keeping the reaction components in the presence or absence of a solvent at temperatures of from about 0° C. to 500° C. over periods ranging from a few minutes to several hours. The progress of the reaction may be followed from the evolution of gas and from the change in viscosity. In some cases, it is advantageous to carry out the reaction in several stages or to add the individual components in a different order or at different temperatures. For example, particularly good results are obtained when the polyisocyanate is reacted with a diol to form a polycarbamic acid ester before the acid anhydride is added or when the acid anhydride is reacted with an alcohol to form a semiester before the polyisocyanate is added. Irrespective of the order in which the reaction components are added, a condensation product may be produced in a first step, for example in a solvent, and may subsequently be converted into the high molecular weight reaction product at elevated temperatures, possibly with evaporation of the solvent and chain extension or crosslinking. In general, from 1 to 2 vals of hydroxyl groups and from 0.5 to 1.5 vals of acid anhydride groups are used per val of isocyanate group, although appreciable deviations from these quantitative ratios are also possible.

It is also possible to add polycarboxylic acids such as terephthalic acid or ester and polyols or saturated cyclic carboxylic acid anhydrides, for example, during the inventive polycondensation, optionally together with diamines and polyols or polycarbamic acid esters, in which case ester or ester imide groups are additionally incorporated. Examples of this are the condensation of terephthalic acid dimethyl ester with ethylene glycol, glycerol and trihydroxy ethyl isocyanurate to form a polyester and the condensation of trimellitic acid anhydride or butane tetracarboxylic acid with a polycarbamic acid ester of 2,4- tolylene diisocyanate or 4,4'-diisocyanatodiphenyl methane and ethylene glycol to form additionally polyimide esters. The quantitative ratios in which these additions are used may vary within wide limits although quantities of from 10% to 400% by weight, based on the condensate according to the invention, are preferred.

The reaction according to the invention may be influenced by the use of catalysts of the type known and used for isocyanate reactions and ester-forming reactions, for example amines such as triethylamine, 1,4-diazabicyclo-(2,2,2)-octane, N-ethyl morpholine and N-methyl imidazole, and also organic and inorganic metal compounds, especially iron, lead, zinc, tin, copper, cobalt and titanium, such as iron(III)chloride, cobalt acetate, lead oxide, lead acetate, zinc octoate, dibutyl tin dilaurate, copper acetyl acetonate and titanium tetrabutylate, and phosphorus compounds such as trialkyl phosphine and 1-methyl phospholine oxide.

The condensation products may be modified by the simultaneous use and incorporation of, for example, polyesters, polycarbamic esters, polyethers and polyhydantoins. A polycarbamic acid ester of a polyester and 2,4-tolylene diisocyanate, a polyester of terephthalic acid, isophthalic ethylene glycol and glycerol and a polyether of bis-hydroxyphenyl propane are mentioned as examples.

The polycondensates obtainable by the process according to the invention are distinguished by their outstanding thermal stability and are suitable for the production of lacquers, films and shaped articles. Their properties may be varied within wide limits for the various applications envisaged by the addition of fillers, pigments and low molecular weight and high molecular weight components, for example for the production of wire lacquers by admixture with polyesters, polycarbamic esters and polyimide esters.

EXAMPLE 1

31 g of ethylene glycol were introduced into 280 g of a commercial cresol mixture and the solution was heated to 120° C. 87 g of a mixture of 80% of 2,4- and 20% of 2,6-tolylene diisocyanate were then added dropwise at that temperature. The exothermic reaction was regulated by cooling and by the rate of the dropwise addition. On completion of the addition, the mixture was stirred for 1 hour at 120° C., after which 98 g of maleic acid anhydride were added. After heating to 170° C., the mixture was stirred for 5 hours at that temperature. The condensation reaction was accompanied by the elimination of carbon dioxide. The mixture was then stirred for 2 hours at 190° C. and for 2 hours at 200° C. A brown viscous solution was obtained with the bands typical of nitrogen heterocycles of the imide series at 1715 and 1775 cm$^1$. The viscosity of a sample, diluted with cresol to 15%, amounted to 70 mPas at 25° C.

A solution was prepared from 300 g of the reaction product with 100 g of a polyester of terephthalic acid, ethylene glycol and glycerol, 200 g of a commercial cresol mixture and 3 g of titanium tetrabutylate as catalyst and was used for lacquering a 0.7 mm diameter copper wire in a stoving furnace:
furnace length: 4 mm
furnace temperature: 400° C.
number of passes: 6.

A lacquer film with an abrasion resistance (NEMA) of 49 and a softening temperature of 330° C. was obtained at a take-off rate of 8 meters per minute.

EXAMPLE 2

74 g of 2,4-tolylene diisocyanate were added dropwise at 110° C. to a solution of 148 g of butanol in 420 g of m-cresol. After stirring for 1 hour at 100° C., 98 g of maleic acid anhydride were added and the mixture was stirred for 2 hours at 170° C., for 4 hours at 190° C. and for 10 hours at 200° C. A brown viscous solution with IR-bands at 1715 and 1780 cm$^{-1}$ was obtained, which after dilution with cresol to 15%, had a viscosity of 30 mPas at 25° C.

EXAMPLE 3

174 g of a mixture of 80% of 2,4- and 20% of 2,6-tolylene diisocyanate were initially introduced with cooling at 120° C. into 370 g of a commercial cresol mixture, followed by the addition of 196 g of maleic acid anhydride. The mixture was then stirred for 3 hours at 170° C., for 5 hours at 190° C. and for 10 hours at 200° C. The reaction mixture was then made into a lacquer solution by the addition of 280 g of a polyester of terephthalic acid, ethylene glycol and glycerol, 770 g of m-cresol, 170 g of a commercial xylene mixture and 8.5 g of titanium tetrabutuylate. A 0.7 mm diameter copper wire was coated with this solution in the same way as described in Example 1. A lacquer film with an excellent surface and a softening temperature of >330° C. was obtained at a take-off rate of 11 meters per minute.

EXAMPLE 4

250 g of 4,4'-diisocyanatodiphenyl methane were introduced at 120° C. into 100 g of toluene and 62 g of ethylene glycol and the mixture was subsequently stirred for 1 hour at 120° C. 98 g of maleic acid anhydride and 350 g of cresol were then added and the condensation reaction was carried out for 2 hours at 150° C.

and for 3 hours at 190° C. The reaction product was a clear dark brown solution with IR-bands at 1715 and 1775 cm$^{-1}$.

EXAMPLE 5

62 g of ethylene glycol were introduced into 100 g of toluene, followed by the addition at 110° C. of 174 g of a mixture of 80% of 2,4-and 20% of 2,6-tolylene diisocyanate. After 30 minutes at that temperature, 500 g of m-cresol and 98 g of maleic acid anhydride were added and condensation was carried out for 2 hours at 190° C., for 2 hours at 195° C. and for 2 hours at 205° C. The condensation product was then mixed in a ratio of 1:1 with a polyester of terphthalic acid, glycerol and ethylene glycol and diluted with phenols to a solids content of 40% and then with cresol/xylene (7:3) to a solids content of 30%. The 30% solution had a viscosity $\eta^{25}$ of 460 mPas. Following the addition of 1.5% of titanium tetrabutylate, lacquering was carried out in the same way as described in Example 1, giving a lacquer film with an abrasion resistance of 27 strokes and a softening temperature of >330° C. at a take-off rate of 7 meters per minute.

EXAMPLE 6

To 186 g of ethylene glycol were added at 120° C. 174 g of a mixture of 80% of 2,4- and 20% of 2,6-tolylene diisocyanate under cooling. The mixture was then heated for 1 hour at 120° C., followed by the addition of 96 g of trimellitic acid anhydride and 49 g of maleic acid anhydride. The reaction mixture was then heated for 6 hours to 190° C., for 2 hours to 200° C. and, under nitrogen, for another 6 hours to 210° C. A light-brown resin was obtained which was melted together with 328 g of a polyester of terephthalic acid, ethylene glycol and glycerol and then dissolved in 100 g of cresol and 820 g of phenol. A lacquer solution was prepared by the addition of 9 g of titanium tetrabutylate and 100 g of xylene, being applied to a copper wire in the same way as in Example 1. A lacquer film with an abrasion resistance of 28 strokes and a softening temperature of >320° C. was obtained at a take-off rate of 7 meters per minute.

EXAMPLE 7

87 g of a mixture of 80% of 2,4- and 20% of 2,6-tolylene diisocyanate were introduced at 120° C. into 280 g of a commercial cresol mixture and 31 g of ethylene glycol. 24.5 g of maleic acid anhydride and 144 g of trimellitic acid anhydride were then added and the mixture was stirred for 5 hours at 170° C., for 2 hours at 190° C. anf for 4 hours at 205–210° C. A brown viscous solution was obtained and was diluted with cresol to a solids content of 30%. The viscosity $\eta^{25}$ of a 15% solution in cresol amounted to 60 cP. A sample was coated onto a glass plate and stoved first at 200° C. and then at 300° C. to form a clear hard lacquer film.

A 30% solution of a polyester of terephthalic acid, glycerol and ethylene glycol in cresol was mixed with the 30% resin solution, 1.5% of titanium tetrabutylate was added and the solution obtained was applied to a 0.7 mm diameter copper wire and stoved in the same way as described in Example 1. For a take-off rate of 8 meters per minute and at a furnace temperature of 400° C., the lacquer film obtained had an abrasion resistance of 37 strokes and a softening temperature >320° C.

What we claim is:
1. Processes for the production of a polycondensate linked through five membered nitrogen containing rings, wherein unsaturated cyclic carboxylic acid anhydride compounds corresponding to the general formula:

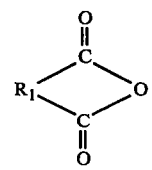

in which R$_1$ represents a mono-unsaturated organic radical, is reacted with a monofunctional or polyfunctional aliphatic, aliphatic-aromatic or aromatic alcohol and a polyfunctional organic isocyanate at a temperature in the range from 0° C. to 500° C.

2. Processes as claimed in claim 1, wherein the reaction is carried out at a temperature in the range of from 30° C. to 400° C.

3. Processes as claimed in claim 1, wherein the alcohol is a compound of the general formula $R_5(OH)_n$ in which R$_5$ represents an aliphatic radical containing from 1 to 20 carbon atoms, an aliphatic-aromatic radical containing from 7 to 12 carbon atoms, an aromatic radical containing from 6 to 12 carbon atoms, a cycloaliphatic radical containing from 5 to 10 carbon atoms or the residue of a polyether, polyester, polyurea, polyurethane, polyimide or polyhydantoin and n is an integer from 1 to 3.

4. Processes as claimed in claim 3, wherein the alcohol is an aliphatic diol.

5. Processes as claimed in claim 1, wherein in the general formula R$_1$ represents a mono-unsaturated aliphatic radical with C$_2$–C$_{10}$.

6. Processes as claimed in claim 1 wherein the unsaturated cyclic carboxylic acid anhydride is the anhydride of maleic acid, dimethyl- or dichloro-maleic acid, citraconic acid or itaconic acid.

7. Processes as claimed in claim 1, wherein in a first step, the polyisocyanate is reacted with the alcohol to form a carbamic ester which, in a second step, is subsequently reacted with the acid anhydride.

8. Processes as claimed in claim 1, wherein, in a first step, the acid anhydride is reacted with the alcohol to form a semiester which is subsequently reacted with the polyisocyanate.

9. Processes as claimed in claim 1, wherein the polycondensation reaction is carried out in the presence of an organic polycarboxylic acid and an aliphatic polyol.

10. Processes as claimed in claim 1, wherein the polycondensation reaction is carried out in the presence of a saturated cyclic carboxylic acid anhydride.

11. Polycondensates obtained by a process claimed in claim 1.

12. A wire insulated with a polycondensate as claimed in claim 11.

* * * * *